Dec. 30, 1952 W. V. DE MARIA 2,623,317
LINE GUIDE FOR FISHING RODS
Filed Sept. 14, 1950

INVENTOR
WILLIAM V. DE MARIA

BY
*Lindsey and Prutzman*
ATTORNEYS

Patented Dec. 30, 1952

2,623,317

UNITED STATES PATENT OFFICE 2,623,317

LINE GUIDE FOR FISHING RODS

William V. De Maria, Bristol, Conn., assignor to The Horton Bristol Manufacturing Company, a corporation of Connecticut Application September 14, 1950, Serial No. 184,807

3 Claims. (Cl. 43—24)

This invention relates to a line guide for fishing rods and more particularly to a guide which may be detachably and adjustably mounted on rods having either rectilinear or curvilinear cross-sectional configurations.

The guide of this invention may be advantageously used on any type fishing rod, but it has particular utility in connection with telescoping rods. Telescoping rods utilizing fixed guides are capable of only limited telescoping due to interference by the guides, and accordingly the number and spacing of the guides that can be used on the rod are determined by the number of telescoping sections and the lengths of the sections.

It is an object of this invention to provide a fishing line guide which may be detachably and adjustably mounted on a fishing rod, regardless of the cross-sectional configuration of the rods.

Another object of this invention is to provide a fishing line guide of simplified construction and which may be economically manufactured on a mass production basis.

It is a specific object of this invention to provide a fishing line guide which may be detachably mounted on the fishing rod and which may be shifted to a desired position on the rod and there held by means wholly incorporated within the guide structure.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
Fig. 1 is a fragmentary view of a fishing rod having guides constructed in accordance with this invention spaced therealong.

As shown in detail in the drawing, the reference numeral 10 indicates generally a fishing line guide constructed in accordance with this invention detachably and adjustably mounted on a fishing rod 11 having a hexagonal cross section.

The body of the guide 10 comprises a pair of axially spaced sleeves 12 which embrace the rod 11 in slidable engagement. The sleeves 12 are formed from tubular stock having hexagonal cross sections defining the angularly related walls 13. The lowermost wall 13 is common to each of the sleeves 12 and bridges the gap between the sleeves. A radially inwardly crimped portion 14 is provided in the lowermost wall 13 midway between the sleeves 12 to spring against the rod 11 and present frictional resistance to movement of the guide 10 relative to the rod 11. The resistance offered by the crimp or detent 14 may be overcome by the fisherman so that the guides may be shifted and spaced along the rod 11 to suit his fancy. However, the resistance is sufficient to prevent inadvertent sliding or rotation of the guides while the rod is being used.

Figure 2:
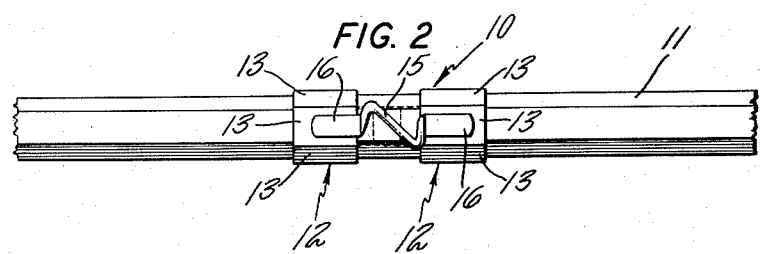
Fig. 2 is a top plan view, on enlarged scale, of the line guide of this invention taken with a portion of the fishing rod.
Figure 3:
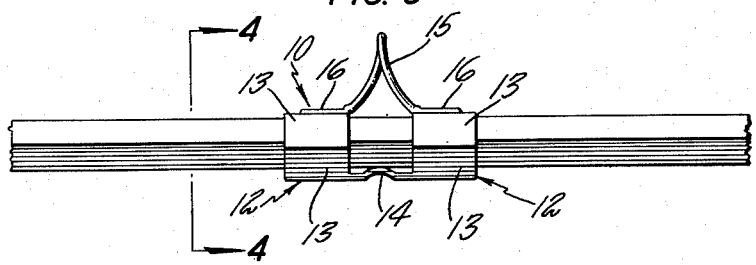
Fig. 3 is a side elevational view of the line guide and rod portion of Fig. 2.
Figure 4:
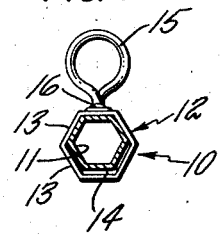
Fig. 4 is a vertical cross-sectional view of the hexagonal fishing rod of Fig. 3 taken as indicated by line 4—4 and showing an end elevational view of the line guide.

The eye portion of the guide is formed by a wire 15 helically rolled or looped as shown in the drawing and having longitudinally extending flattened end portions 16 engaging the respective top walls 13 of the sleeves 12, as shown in Fig. 2. The eye 15 is secured to the body as by welding the end portion 16 to the sleeves 12. When viewed from the end of the guide 10, as in Figs. 4 and 5, the eye 15 is substantially circular so as to define a closed loop for receiving the fishing line. The closed loop or eye and the associated body of the guide do not present any rough edges or shoulders to interfere with or in any way snag the fishing line and due to the elongated loop or snake-like configuration of the eye, there is little possibility of snagging the line by inadvertently looping the same about the outer periphery of the eye member.

Figure 5:
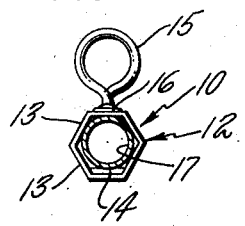
Fig. 5 is a view similar to Fig. 4 but showing the guide as mounted on a fishing rod of curvilinear cross section.

For purposes of illustration, the guide 10 has been shown with a rod 11 of hexagonal cross-sectional configuration, but the guide 10 may also be used with a rod having curvilinear cross-sectional configuration such as the rod 17 in Fig. 5. The frictional grip of the crimp 14 springs the guide 10 downwardly so that there is relatively tight engagement between the walls 13 and the top portion of the rod 17 as well as between the crimp and the rod. The spring action occurs in the bottom wall 13 about the crimp 14 as a fulcrum so that the sleeves 12 are biased downwardly from true axial alignment. When placing a guide over the end of a rod section it is necessary that one sleeve 12 be first placed over the end and then the other sleeve must be forced into alignment against the spring pressure in the bottom or spring wall.

It will be understood that the line guide of this invention may be used for rods which vary in type of construction as well as in cross-sectional configuration. The guides may be spaced as desired along a single piece rod as well as along telescoping rods. Since fishing rods generally taper toward the tip, various sizes of guides may be provided for a single rod to permit spacing of the guides at regular or irregular intervals along the length of the rod.

Since the guides may be completely detached from the rod, a telescoping rod employing the guides of this invention may be completely telescoped and more than one guide may be furnished for each section.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A fishing rod mounting comprising a one-piece body member having axially spaced sleeve portions each of said sleeve portions having angularly related walls slidably embracing the fishing rod, a web integrally formed on the bottom of said body member and interconnecting said sleeve portions as a spring wall, detent means on said spring wall engaging the rod and biasing said sleeve portions downwardly about said detent means as a fulcrum whereby to prevent inadvertent movement of the body member relative to the rod, and a generally helical eye piece bridging the space between said sleeve portions oppositely disposed on said spring wall, said eye piece having longitudinally extending end portions secured to said sleeve portions.

2. A line guide for a fishing rod comprising a one-piece body member having axially spaced sleeve portions slidably embracing the rod and a spring wall interconnecting the sleeve portions, said spring wall having a radially inwardly directed crimped portion engaging the rod, and an eye member secured to one of the sleeve portions.

3. A line guide for a fishing rod comprising a one-piece body member having axially spaced sleeve portions and a spring wall interconnecting the sleeve portions, each of said sleeve portions having angularly related walls slidably engaging the rod, said spring wall having a radially inwardly directed crimped portion engaging the rod between said sleeve portions to prevent inadvertent movement of the body member relative to the rod, and a one-piece eye member having axially arranged end portions secured, respectively, to said sleeve portions.

WILLIAM V. DE MARIA.

REFERENCES CITED

The following references are of record in the file of this patent:

UNITED STATES PATENTS

| Number | Name | Date |
|---|---|---|
| 1,993,342 | Gurrieri et al. | Mar. 5, 1935 |
| 2,227,868 | Tengel | Jan. 7, 1941 |
| 2,398,862 | Sarkisian | Apr. 23, 1946 |
| 2,518,128 | Dufilho | Aug. 8, 1950 |